Nov. 24, 1953  J. W. BIROSH  2,660,251
INSECTICIDE SPRAY
Filed July 12, 1950

John W. Birosh
INVENTOR.

Patented Nov. 24, 1953

2,660,251

UNITED STATES PATENT OFFICE 2,660,251

INSECTICIDE SPRAY

John W. Birosh, Roulette, Pa.

Application July 12, 1950, Serial No. 173,441

1 Claim. (Cl. 169—159)

This invention relates generally to apparatus for dispensing liquid insecticide and the like.

A primary object of the invention is to provide dispensing apparatus for liquid insecticide and like substances, used in the treatment of cattle and other animals, as well as spraying of plants, the device being easily portable and operable by the use of one hand, the other hand being thus freed for manipulation or holding of the animal or other article being sprayed.

Another object of this invention is to provide a dispensing apparatus wherein the applicator is in a form adapting it to be used as a comb to part the hair of the animal being sprayed, as well as functioning as a distributor head for the spray when used in any environment.

Still another object of this invention is to provide a special applicator construction wherein a comb-like distributor head is threadedly connected to the main portion of the applicator, thus facilitating the replacement of the distributor head, and a number of such heads of different sizes and character may be provided with the device, to the end that the device is adaptable for a wide variety of uses.

Yet another object of this invention, ancillary to the immediately preceding objects, is to provide an applicator wherein the removable head makes the valve part easily accessible for cleaning or repair, this feature being important since many insecticides and like products carry substances of limited solubility and the valve is likely to become clogged after long periods of use.

A last object to be mentioned specifically is to provide an applicator distributor head having teeth with rounded end portions and openings disposed laterally of these rounded end portions and communicating with bores in the teeth, so that the openings do not tend to become clogged when the device is used as a comb during the actual application of insecticide to animals and so that the insecticide is spread.

A general object of the invention is to provide a dispensing apparatus of the character mentioned which is relatively inexpensive, practicable to manufacture, simple, convenient and safe to use, and which will give generally efficient and durable service.

With these objects definitely in view, this invention resides in certain novelties in construction, combination and arrangement of elements and portions as will be hereinafter described in detail in the specification, particularly pointed out in the appended claims, and illustrated in the accompanying drawings which form a material part of this specification, and in which:

Similar characters of reference designate similar or identical elements and portions throughout the specification and throughout the different views of the drawings.

Figure 1:
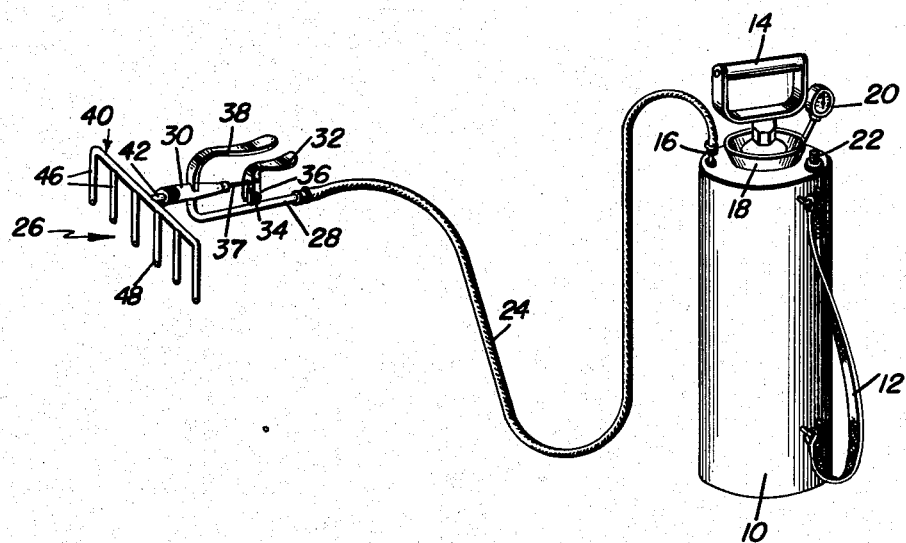
Figure 1 is a view, in perspective of the assembled device.
Figure 2:
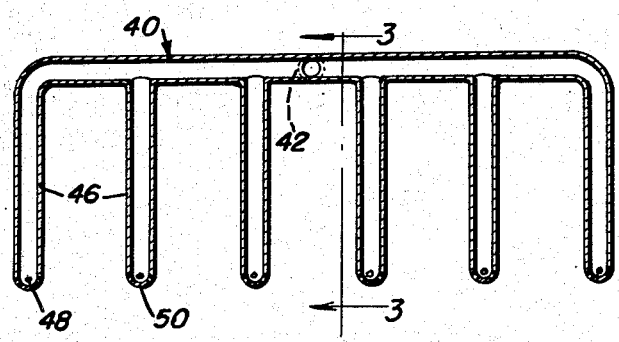
Figure 2 is a longitudinal vertical sectional view of the comb-like distributor head of the applicator, the view being taken substantially on the line 2—2 in Figure 3; and, Figure 3 is a vertical cross sectional view taken on the line 3—3 in Figure 2.

Referring now to the drawings in detail, this invention includes a source of pressurized liquid insecticide embodying a pressure cylinder 10, which will preferably be equipped with a carrying strap 12, and a pump, not shown in detail, will be operatively mounted within the cylinder 10 according to conventional practice, the Figure 1 showing the operating handle 14 of such a pump. It will be noted that the cylinder 10 is represented as having a funnel-shaped filler opening 18, an outlet nipple 16, as well as a conventional pressure gage 20, and means for attachment thereto of a motorized air compressor, indicated at 22, when such is desired.

A flexible tube 24 connects the outlet nipple 16 with the applicator generally indicated at 26. This applicator includes an inlet tube 28 having a valve body 30 rigidly secured thereto, and a valve actuating lever 32 pivotally secured to an ear 34 on the inlet tube 28, by means of a pivot pin 36. The particular valve structure is unimportant in this invention, since any suitable valve capable of effectively closing and opening the connection between the inlet tube 28 and the valve body 30 can be used. The valve stem 37 will, however, in all cases be secured pivotally to the actuating lever 32. An L-shaped handle 38 is rigidly secured to the valve body 30 at one end and extends in offset relation from the valve body, opposed to the inlet tube 28, substantially parallel to the actuating lever 32, and the actuating lever 32 is disposed between the handle 38 and the inlet tube 28, so that the lever 32 can be operated by one or more of the fingers of the operator's hand grasping the handle 38.

Figure 3:
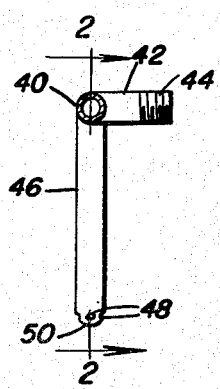

The distributor head of the applicator 26 is comprised of a T-shaped outlet tube 40 having a shank 42 which is threaded as indicated at 44 in Figure 3, to engage internal threads in the end of the valve body 30 opposite to the actuating lever 32. The outlet tube 40 has hollow teeth 46 with axial bores terminating in openings 48 disposed laterally of rounded closed ends 50 in each tooth. In a preferred form, the openings number four in each tooth.

The operation of this invention will be clearly understood from a consideration of the foregoing description of the mechanical details thereof, taken in connection with the drawings with the above recited objects. In recapitulation, it should again be noticed that the teeth 46, by reason of their closed ends 50 are well adapted for parting the hair of animals during the use of this device, without discomfort to the animals, and the placement of the openings is such that the skin of the animal is not subjected to the full direct force of the spray, thus making the animal easier to hold. Displacements of the openings 48 also aid in preventing the clogging of the openings. Of particular interest also is the feature relating to the provision of the distributor head as replaceable units, so that the heads may be provided in sets of varying sizes adapting the device for a wide variety of uses. Finally, the threaded attachment of the heads provides for easy accessibility to the valve construction for cleaning and repair, this being important in view of the fact that the valve tends to become clogged with the chemicals of limited solubility wherewith the insecticide or like fluid is burdened.

Having described the invention, what is claimed as new is:

For use in connection with a dispensing apparatus for liquid insecticide wherein said apparatus includes a source of pressurized liquid insecticide; a fountain comb embodying a tube provided with lateral longitudinally spaced hollow teeth, said teeth having rounded end portions and bores terminating in openings disposed laterally of the extremities of said rounded end portions, said tube being provided intermediate its ends with a short lateral hollow shank portion externally screw threaded, a valve including a body axially, detachably and communicatively connected with said screw threaded shank and in close proximity to said tube, valve means in said body, a substantially L-shaped inlet tube having one lateral end portion communicatively connected with an intermediate portion of said valve body and having its remaining portion extending in spaced parallelism with the longitudinal axis of said body and projecting beyond an adjacent end of said body, a lever pivotally mounted on the projecting portion of said inlet tube and adjacent to said valve body, an operating connection between the pivotally mounted portion of said lever and valve means in said body, and a rigid L-shaped handle rigidly secured to an intermediate portion of said valve body and having an end portion disposed in close spaced parallel proximity in relation to said lever and permitting the comb to be conveniently handled and the valve to be opened and closed by the same hand used for holding said handle.

JOHN W. BIROSH.

References Cited in the file of this patent
UNITED STATES PATENTS

| Number | Name | Date |
|---|---|---|
| 1,783,237 | Greer | Dec. 2, 1930 |
| 1,829,021 | Sinclair | Oct. 27, 1931 |
| 2,031,774 | Helfrich et al. | Feb. 25, 1936 |
| 2,350,086 | Young et al. | May 30, 1944 |
| 2,532,251 | Whitmire et al. | Nov. 20, 1950 |